(12) United States Patent
Schlenk et al.

(10) Patent No.: US 8,594,046 B2
(45) Date of Patent: Nov. 26, 2013

(54) METHOD OF PERFORMING AN INTRA-SEGMENT HANDOVER

(75) Inventors: Ralph Schlenk, Erlangen (DE);
Christian Hermsmeyer, Eckental (DE);
Armin Dekorsy, Bremen (DE)

(73) Assignee: Alcatel Lucent, Paris (FR)

( * ) Notice: Subject to any disclaimer, the term of this patent is extended or adjusted under 35 U.S.C. 154(b) by 272 days.

(21) Appl. No.: 13/202,215

(22) PCT Filed: Mar. 18, 2010

(86) PCT No.: PCT/EP2010/053570
§ 371 (c)(1),
(2), (4) Date: Aug. 18, 2011

(87) PCT Pub. No.: WO2010/112347
PCT Pub. Date: Oct. 7, 2010

(65) Prior Publication Data
US 2011/0317664 A1   Dec. 29, 2011

(30) Foreign Application Priority Data

Mar. 30, 2009 (EP) ..................... 09290228

(51) Int. Cl.
*H04W 4/00* (2009.01)

(52) U.S. Cl.
USPC ........... 370/331; 370/332; 370/333; 370/334; 455/436; 455/437; 455/440; 455/442

(58) Field of Classification Search
USPC ........................... 370/331–334; 455/436–444
See application file for complete search history.

(56) References Cited

U.S. PATENT DOCUMENTS 6,473,413 B1 * 10/2002 Chiou et al. ................... 370/331
6,947,401 B2 * 9/2005 El-Malki et al. .............. 370/331

(Continued)

OTHER PUBLICATIONS

Kuroda et al., Scalable Mobile Ethernet and Fast Vertical Handover, IEEE 2004, figures 3, p. 661.*
Hu et al, Enhancement of Cellular IP Routing by Redirection at Crossover Base Stations, IEEE 2005.*

*Primary Examiner* — Mark Rinehart
*Assistant Examiner* — Mang Yeung
(74) *Attorney, Agent, or Firm* — Carmen Patti Law Group, LLC (57) ABSTRACT

The invention concerns a method of performing an intra-segment handover (HO) of a mobile station (MS) from a source access point (AP1) of a tree-structured segment (S1) of an Ethernet-compliant telecommunication network to a target access point (AP2) of said segment (S1), as well as a switch (SW-123) to support the execution of this method. After establishing contact between the mobile station (MS) and the target access point (AP2), the mobile station (MS) sends an update entry request addressed to the segment gateway switch (GW). The update entry request is received by a switch (SW-123) positioned in the tree structure of the segment (S1) hierarchically above the source and target access points (AP1, AP2) and below the segment gateway switch (GW). The switch (SW-123) checks whether its forwarding database contains a first entry comprising an address of the mobile station (MS) received by means of the update entry request. If the forwarding database of the switch (SW-123) contains the first entry, the switch (SW-123) squelches said update entry request and assumes the function of an anchor switch regarding the handover (HO), whereby the anchor switch is a switch of the segment (S1) which is positioned in the tree structure of the segment (S1) hierarchically above the source and target access points (AP1, AP2) and below the segment gateway switch (GW) and which is common to the ongoing session before and after the handover (HO).

12 Claims, 5 Drawing Sheets

(56) References Cited

U.S. PATENT DOCUMENTS

| | | | |
|---|---|---|---|
| 2004/0137888 A1* | 7/2004 | Ohki | 455/417 |
| 2006/0159049 A1* | 7/2006 | Chung | 370/331 |
| 2007/0127414 A1* | 6/2007 | Sridhar et al. | 370/331 |
| 2008/0170546 A1* | 7/2008 | Kitamura | 370/331 |

* cited by examiner

METHOD OF PERFORMING AN INTRA-SEGMENT HANDOVER

The present invention relates to a method of performing an intra-segment handover of a mobile station from a source access point of a tree-structured segment of an Ethernet-compliant telecommunication network to a target access point of said segment, and a switch of the segment to be used in said method.

A critical aspect in mobile networks is a handover of a mobile terminal between two access points. Handover processes generate a great amount of control data which has to be sent over the network in order to update other network resources.

M. Kuroda, M. Inoue, A. Okubo, T. Sakakura, K. Shimizu, and F. Adachi, "Scalable Mobile Ethernet and Fast Vertical Handover", IEEE Wireless Communications and Networking Conference (WCNC) 2004, March 2004 describe mobility management in Ethernet-based network architectures. Flat Ethernet-based network architectures reaching into the mobile domain are grouped under the term "Mobile Ethernet". A Mobile Ethernet network relies on loop-free, "fat tree"-structured network segments wherein a Segment Gateway Switch is the root of a segment and wire-line or wireless access points (WLAN, WiMAX, DSL) are the leaves of a segment (WLAN=Wireless Local Area Network; WiMAX=World-wide Interoperability for Microwave Access; DSL=Digital Subscriber Line). Currently, an intra-segment handover in a Mobile Ethernet network results in a great amount of traffic in the network segment.

It is the object of the present invention to provide an improved intra-segment handover of a mobile station within a tree-structured segment of an Ethernet-compliant telecommunication network.

The object of the present invention is achieved by a method of performing an intra-segment handover of a mobile station from a source access point of a tree-structured segment of an Ethernet-compliant telecommunication network to a target access point of said segment, whereby a segment gateway switch is the root node of the tree-structured segment, and whereby the source access point and the target access point are leaf nodes of the tree-structured segment, the method comprising the steps of relaying, by the source access point, session traffic associated with an ongoing session to and from the mobile station; after establishing contact between the mobile station and the target access point, sending, by the mobile station or the target access point, an update entry request addressed to the segment gateway switch whereby the update entry request contains an address of the mobile station; receiving, by a switch positioned in the tree structure of the segment hierarchically above the source and target access points and below the segment gateway switch, the update entry request; checking, by the said switch, whether a forwarding database of the switch contains a first entry comprising the address of the mobile station received by means of the update entry request; squelching, if the forwarding database of the switch contains the said first entry, said update entry request by the switch and assuming by the switch the function of an anchor switch regarding the handover, whereby the anchor switch is a switch of the segment which is positioned in the tree structure of the segment hierarchically above the source and target access points and below the segment gateway switch and which is common to the ongoing session before and after the handover; based on said update entry request, bi-casting, by the switch serving as the anchor switch, the session traffic addressed to the mobile station both via the source access point and the target access point; when disconnecting the mobile station from the source access point, sending, by the mobile station or the source access point, a cancel entry request addressed to the segment gateway switch; and receiving and squelching said cancel entry request by the switch serving as the anchor switch and discontinuing, based on said cancel entry request, the routing of the session traffic addressed to the mobile station via the source access point. The object of the present invention is further achieved by a switch of a tree-structured segment of an Ethernet-compliant telecommunication network, the switch serving as an anchor switch regarding an intra-segment handover of a mobile station from a source access point of the segment to a target access point of the segment, whereby a segment gateway switch is the root node of the tree-structured segment and the source access point and the target access point are leaf nodes of the tree-structured segment, whereby the anchor switch is a switch of the segment whose position in the tree structure of the segment is hierarchically above the source and target access points and below the segment gateway switch and which is common to an ongoing session before and after the handover, and whereby session traffic associated with the ongoing session is relayed, before the handover, by the source access point to and from the mobile station, the switch comprising a control unit adapted to receive an update entry request addressed to the segment gateway switch which is sent, after establishing contact between the mobile station and the target access point, by the mobile station or the target access point, whereby the update entry request contains an address of the mobile station; check whether a forwarding database of the switch contains a first entry comprising the address of the mobile station received by means of the update entry request; if the forwarding database of the switch contains the said first entry, squelch said update entry request and assume the function of the anchor switch regarding the handover; based on said update entry request, bi-cast the session traffic addressed to the mobile station both via the source access point and the target access point; receive and squelch a cancel entry request addressed to the segment gateway switch which is sent by the mobile station or the source access point when disconnecting the mobile station from the source access point; and discontinue, based on said cancel entry request, the routing of the session traffic addressed to the mobile station via the source access point.

The step of receiving the update entry request, by a switch positioned in the tree structure of the segment hierarchically above the source and target access points and below the segment gateway switch, is performed by one or more switches lying on the routing path of the update entry request from the mobile station and the target access point, respectively, to the segment gateway switch. The order in which the one or more switches perform this receiving step corresponds to the order in which the update entry request is routed via the one or more switches. Therefore, the first of the one or more switches which finds that its forwarding database contains the said first entry comprising the address of the mobile station assumes the function of the anchor point. As a consequence, the switch serving as the anchor point is the "right" anchor point, i.e. the hierarchically lowest switch via which the ongoing session packets have been routed before the handover. "Hierarchically lower" means "closest to the mobile station", i.e. reachable by a packet from the mobile station via the least routing hops.

The Ethernet-compliant telecommunication network is partitioned into a plurality of interconnected segments comprising switches (=nodes). The segment switches of a segment are arranged in a tree structure, i.e. each switch arranged in the tree-structure of a segment has a parent node which is hierarchically above it in the tree and one or more child nodes which are hierarchically below it in the tree. The hierarchically top-most switch in the tree is called the root node, the hierarchically bottom-most switches in a tree are called the leaf nodes (by convention, trees grow down, not up as they do in nature). The root node has no parents. It is the node at which operations on the tree begin. All other nodes of the segment can be reached from it by following links. In diagrams, it is typically drawn at the top. An internal node or inner node is any node of a tree that has child nodes and is thus not a leaf node.

The switches in a segment have a path-learning function. By means of a path-learning function, a routing path of a packet to a destination MAC address is learned at all switches lying on the routing path and unnecessary broadcast is suppressed once the path is learned (MAC=media access control).

The bi-casting (=casting twice) by the switch serving as the anchor switch is related to the following: During a handover, i.e. a movement of a mobile station from a source access point to a target access point during an ongoing session, the switch serving as the anchor switch bi-casts payload traffic (session packets carrying voice data, media data, etc.) associated with the ongoing session both to the source access point and the target access point to enable a soft handover, i.e. a handover during which minimal traffic is lost.

The present invention proposes a more efficient mobility management for mobile Ethernet networks, thus improving network performance and scalability. The present invention avoids the disadvantages of the prior art where all handover control packets have to be routed via the segment gateway switch, which increases the control traffic load on the segment gateway switch as it has to handle handover control information from all mobile stations in the segment controlled by segment gateway switch. The anchor switch does not forward the update entry request towards the segment gateway switch. The present invention avoids unnecessary control traffic. This relieves the segment gateway switch of a great amount of control traffic.

As the number of mobile terminals and frequency of terminal movements will increase in future mobile (Ethernet) networks, control traffic reduction can greatly improve their performance and scalability. The present invention proposes a method to reduce handover-related traffic in a Mobile Ethernet architecture.

The present invention provides a significant contribution to a reduction and limitation, respectively, of control traffic in a segment during a handover. This is achieved by means of the squelching of control traffic addressed to the segment gateway switch by the anchor switch and by reducing the bi-casting of session traffic during handover. This achieved reduction and limitation, respectively, of control traffic is essential because state of the art processors (CPUs), which do the termination of control protocols, can only handle a few thousands of packets related to control protocols (CPU=Central Processing Unit).

The present invention provides a handover in a Mobile Ethernet network which is assisted by the mobile station being handed over. The mobile station actively takes part in the Ethernet network handover with its own unique MAC address.

The present invention is based on standard processes. Therefore the method according to the present invention is feasible on existing hardware, i.e. a network switch. It is possible to implement the method according to the invention in hardware without a need for processing in software. Existing hardware is re-configured, preferably by means of a software upgrade, to perform the method according to the present invention. Thus, the present invention circumvents the limitations set by today's switches which use software implementations. A software implementation limits bandwidth to typically less than a few thousand update messages per second at the segment gateway switch.

By sending a cancel entry request from the mobile station being handed over, or the target access point, according to the invention, an unnecessary delay of the switch-off of the bi-cast, which consumes precious network resources, is avoided. The timely switch-off of the bi-cast, triggered by the cancel entry request, results in a reduction of user traffic. Thus, the present invention avoids a drawback of today's handover methods where an ageing timer has to expire or the anchor switch has to be explicitly re-configured in order to discontinue the bi-cast of the payload associated with the on-going session.

Further advantages are achieved by the embodiments of the invention indicated by the dependent claims.

According to a preferred embodiment of the invention, the switch serving as the anchor switch generates, triggered by the received update entry request, a mapping of the received address of the mobile station to a route via the target access point and adds that mapping as a second entry to the forwarding database of the switch serving as the anchor switch. Said forwarding database of the switch serving as the anchor switch already contains a mapping of the address of the mobile station to a route via the source access point as the said first entry. An entry in a forwarding database of a switch indicates via which access point the session traffic addressed to the mobile station is to be routed to the mobile station. Triggered by the received cancel entry request, the switch serving as the anchor switch deletes the said first entry from the said forwarding database of the switch serving as the anchor switch.

For example, the switch serving as the anchor switch is a Layer 2 switch according to the OSI model (OSI=Open Systems Interconnection). The switch serving as the anchor switch comprises a path-learning function whereby a routing path of a packet to a destination MAC address is learned and stored in a path-learning cache, representing the aforementioned forwarding database.

It is further possible that the switch which is appropriate to serve as the anchor switch is identified, when sending the update entry request, based on the presence of the first entry in the forwarding database of this switch. When sending the cancel entry request, the switch serving as the anchor switch is preferably identified based on the presence of the first entry and the second entry in the forwarding database of the anchor switch.

It is possible that one or more first switches of a segment lying on a routing path of the update entry request via the target access point towards the segment gateway switch learn the address of the mobile station from said update entry request and add a forwarding entry associated with a learned address to a respective forwarding database of the first switches. Further, one or more second switches of the segment lying on a routing path of a cancel entry request via the source access point towards the segment gateway switch delete a forwarding entry associated with the address of the mobile station from a respective forwarding database of the second switches based on said cancel entry request.

Further, it is possible that the step of learning the address of the mobile station from said update entry request by said one or more first switches is according to the MAC address learning method as defined in the standard IEEE Std 802.1 D-2004

(clause 7.8). MAC address learning is a basic property of bridged Ethernet networks (IEEE=Institute of Electrical and Electronics Engineers).

Furthermore, it is possible that the second switches replace the forwarding entry associated with the address of the mobile station which is deleted from a respective forwarding database of the second switches based on said cancel entry request with an intermediate state entry which temporarily enables forwarding of session traffic until a forwarding entry associated with the bi-casting by the switch serving as the anchor switch has been removed from the forwarding database of the switch serving as the anchor switch.

It is further possible that the target access point sends, after said establishment of contact between the mobile station and the target access point, a handover request with a source access point. As a response to the received handover request, the source access point sends a handover approval to the target access point. The mobile station or the target access point send the said update entry request address to the segment gateway switch after receipt of the said handover approval.

Possibly, the switch serving as the anchor switch receives the update entry request and the cancel entry request on the same port.

Furthermore, the switch serving as the anchor switch controls by means of a sequence numbering or a buffering procedure the arrival times of two corresponding packets of the bi-cast session traffic at the mobile station whereby one packet of the two corresponding packets arrives at the mobile station via the target access point and the other packet of the two corresponding packets arrives at the mobile station via the source access point.

Furthermore, it is possible that the update entry request and the cancel entry request are Ethernet packets without specific payload. The update entry request and the cancel entry request carry the MAC address of the mobile station as a source address and the MAC address of the segment gateway switch as a destination address. It is possible that the packet transporting the update entry request and the packet transporting the cancel entry request each comprises an indicator, e.g. in the type field of the packet, indicating their status as update entry request and cancel entry request packets. The MAC address learning algorithm only requires the source address, i.e. the MAC address of the mobile station. Preferably, the update entry request is re-sent if the (first) update entry request is lost. The same is true for the cancel entry request.

It is further possible that the target access point sends, before the mobile station is switched in the handover from the source access point to the target access point, a resource availability query to the source access point. By means of the resource availability query, the target access point requests a confirmation message from the source access point that sufficient resources, particularly sufficient bandwidth, are available to the target access point for the handling of the on-going session after the handover of the mobile station from the source access point to the target access point. The source access point receives the said resource availability query and checks whether sufficient resources are available to the target access point for the handling of the on-going session after the handover of the mobile station from the source access point to the target access point. If sufficient resources are available, the source access point sends—as a response to the received resource availability query—an resource availability response to confirm the availability of resources for the handover to the target access point. The target access point receives the said resource availability response and is thus informed that sufficient resources are available for the handover. The source access point disconnects the mobile station only after sending the affirmative resource availability response.

Preferably, when the switch serving as the anchor switch receives the cancel entry request, the switch serving as the anchor switch deletes the first entry from the forwarding database associated with the switch serving as the anchor switch, i.e. the switch serving as the anchor switch discontinues (=switches off) the bi-cast and squelches (=discards) the cancel entry request.

These as well as further features and advantages of the invention will be better appreciated by reading the following detailed description of presently preferred exemplary embodiments taken in conjunction with accompanying drawings of which.

Figure 1:
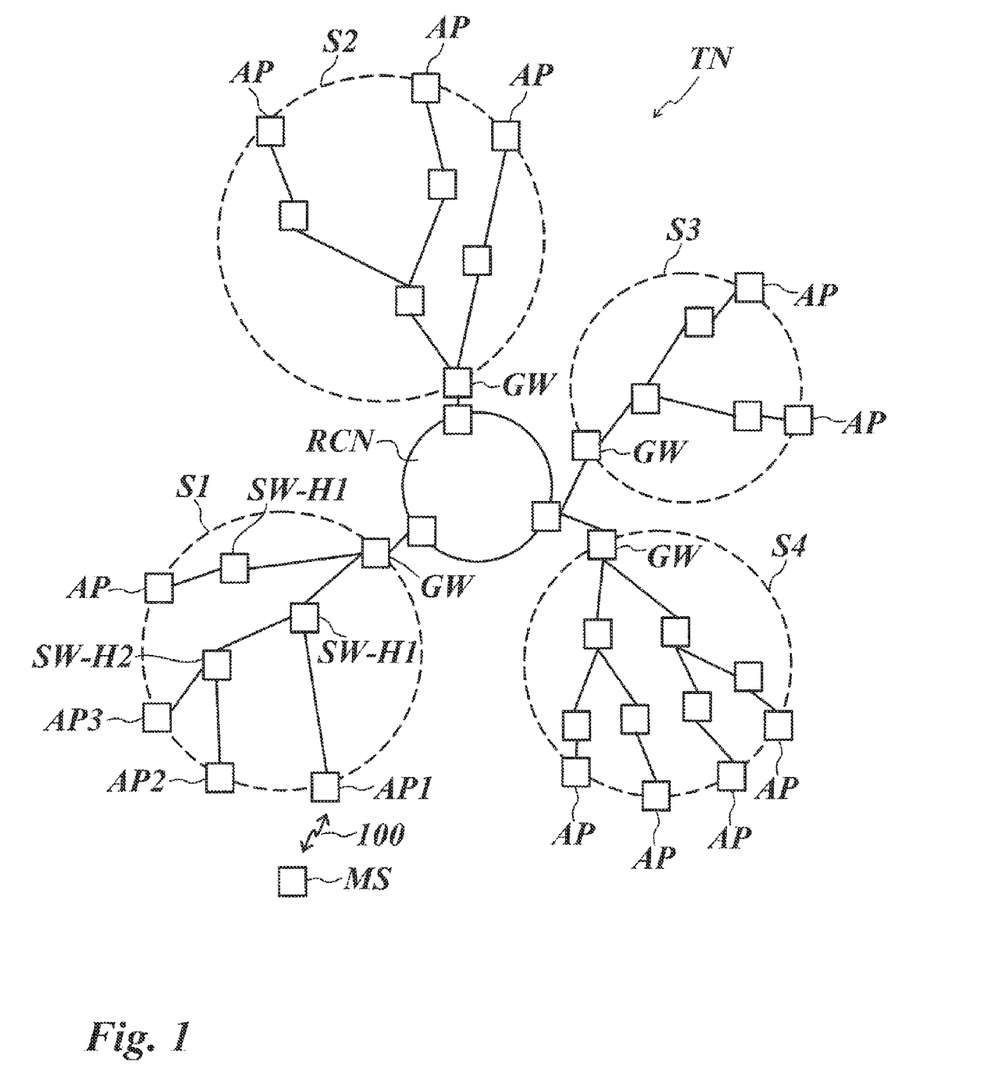
FIG. 1 is a block diagram of a Mobile Ethernet-based telecommunication network.

FIG. 1 is a Mobile Ethernet-compliant telecommunication network TN comprising a plurality of tree-structured network segments S1-S4 defined in Layer 2 according to the OSI model (OSI=Open Systems Interconnection). Each of the segments S1-S4 is interconnected by a fast ring core network RCN such as a RPR (=Resilient Packet Ring). The segments S1-S4 are connected to the ring core network RCN by means of segment gateway switches GW which represent the root nodes of each of the segments S1-S4. Each segment S1-S4 is configured as a tree-structured access network. Access points AP provide mobile terminals with a communication connection to the Ethernet-compliant telecommunication network TN. For example, the access points AP provide access based on WLAN, WiMAX, DSL, Optical Ethernet, 3G (=Third Generation). A segment gateway switch GW is connected via the ring core network RCN to all other segment gateway switches GW of the telecommunication network TN. A switch directly connected to an access point AP and located at the edge of the tree structure, except the access points AP, is called an edge switch. For example, the switch SW-H2 of the segment S1 is an edge switch accommodating the access points AP2 and AP3. An internal switch, e.g. SW-H1, located between an edge switch, e.g. SW-H2, and the segment gateway switch GW forwards frames to the next switch, e.g. SW-H2.

The mobile station MS is used by a subscriber subscribed to a telecommunication service, e.g. a voice and/or media communication service, telephony, VoIP, or email, which is provided by a service provider providing one or more telecommunication services in the segment S1 (VoIP=Voice over IP; IP=Internet Protocol). The mobile station MS is a wireless terminal, e.g., a mobile telephone or a mobile computer operated as a mobile soft phone. The mobile station MS is currently in a communication session 100. The mobile station MS sends outgoing packets associated with the session 100 to the access point AP1 to be routed to the destination address of the packets and receives incoming packets associated with the session 100 from the access point AP1, whereby the incoming packets have been addressed to the mobile terminal MS by a communication partner of the mobile terminal MS.

Figure 2:
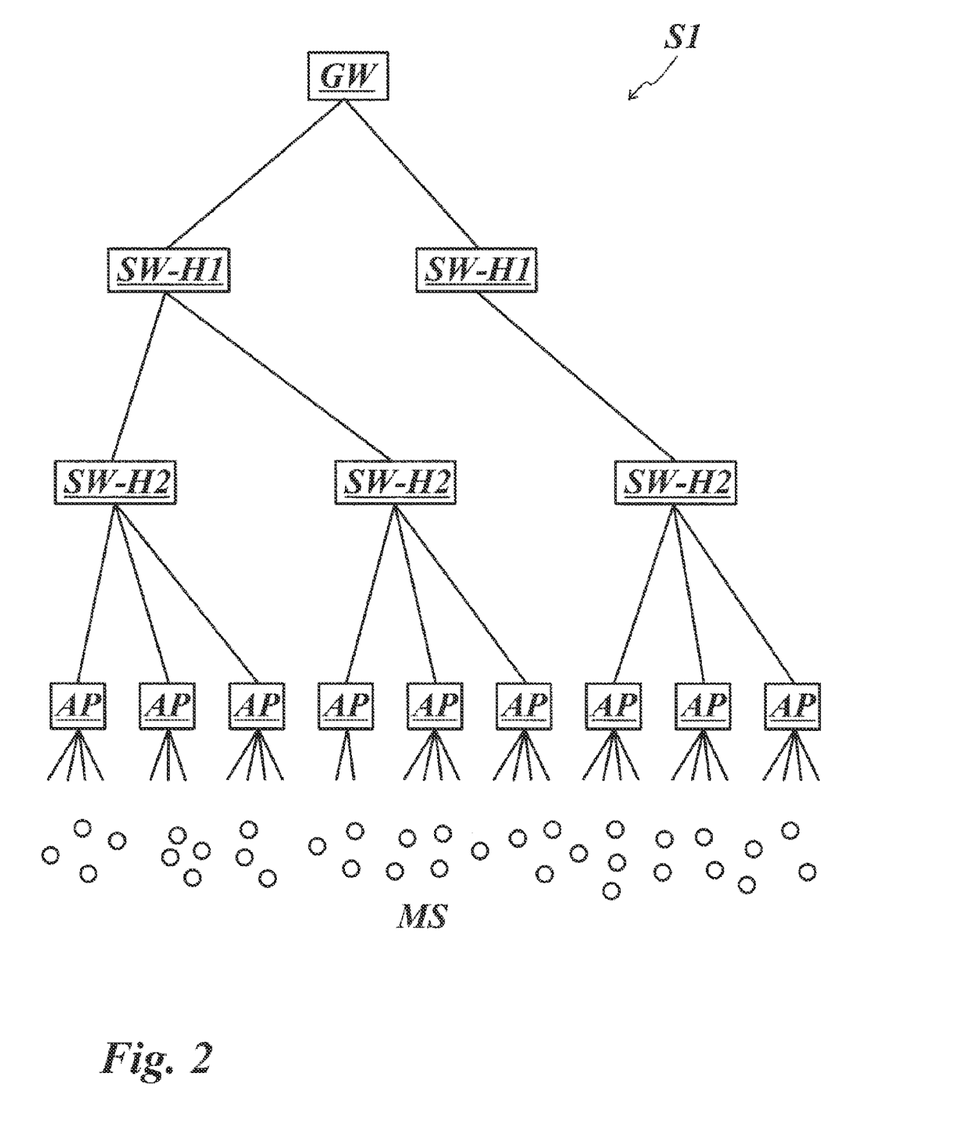
FIG. 2 shows a network hierarchy of an ideal network based on Mobile Ethernet.

FIG. 2 shows a network topology of an ideal network segment S1 of a Mobile Ethernet network. At the top of the hierarchy is the segment gateway switch GW. In the hierarchy one (=H1) level below the segment gateway switch GW are the switches SW-H1 positioned in the H1 level. Typically, a segment gateway switch GW serves approximately five switches of hierarchy one. For example, a typical traffic load between the segment gateway switch GW and the switches of the H1 level may be approximately 10 GB/s. On the next level below the switches of the hierarchy one level are the switches SW-H2 of the hierarchy two (=H2) level. The ratio between the switches SW-H1 and the H2 switches SW-H2 is about 1:20, that means that one switch SW-H1 serves approximately twenty H2 switches SW-H2. The typical traffic load between the switches SW-H1 and the H2 switches SW-H2 is about 5 GB/s. On the next level below the H2 switches SW-H2 are the access points AP. Typically, each H2 switch SW-H2 serves approximately one hundred access points AP. The typical traffic load between the H2 switches 2 SW-H2 and the access points AP is about 1 GB/s. On the lowest level of the hierarchy of the segment S1 are the mobile stations MS, representing mobile service subscribers (=MSS). Each access point AP serves approximately one hundred mobile stations MS. A typical workload between a mobile station MS and an access point AP is about 100 Mb/s.

As a first example illustrating the reduction of control traffic which is achievable by the present invention, let us assume 20,000 handover processes per minute in the segment S1, e.g. during rush-hour. By means of the present invention, 90% of these 20,000 handover processes can be handled by the H2 switches SW-H2. This saves 0.9×2×20,000/60=600 updates per second at the segment gateway switch GW.

Note that there will be additional relief for the control plane if events like table synchronisation (associated with updating a forwarding database) or network reconfiguration are included in the calculation. Furthermore, the strictly hierarchical topology is favourable for the control plane. Thus, the reduction of control traffic which is achievable by the present invention will be much more if the network is not strictly hierarchical.

As a second example illustrating the potential of reduction of bi-cast traffic which is achievable by the present invention, let us assume that there is bi-cast at switch hierarchy H1 SW-H1. For example, when a 5 Mbit/s stream is distributed to one hundred access points AP, this results in 500 Mbit/s of additional traffic. If we assume 20,000 active bi-casts in parallel, there is a total of 10 Tbit/s of additional short-term flooding traffic. By means of the present invention, a great amount of this total traffic can be avoided by relocating the bi-cast traffic to lower hierarchy levels of the segment S1.

Figure 3:
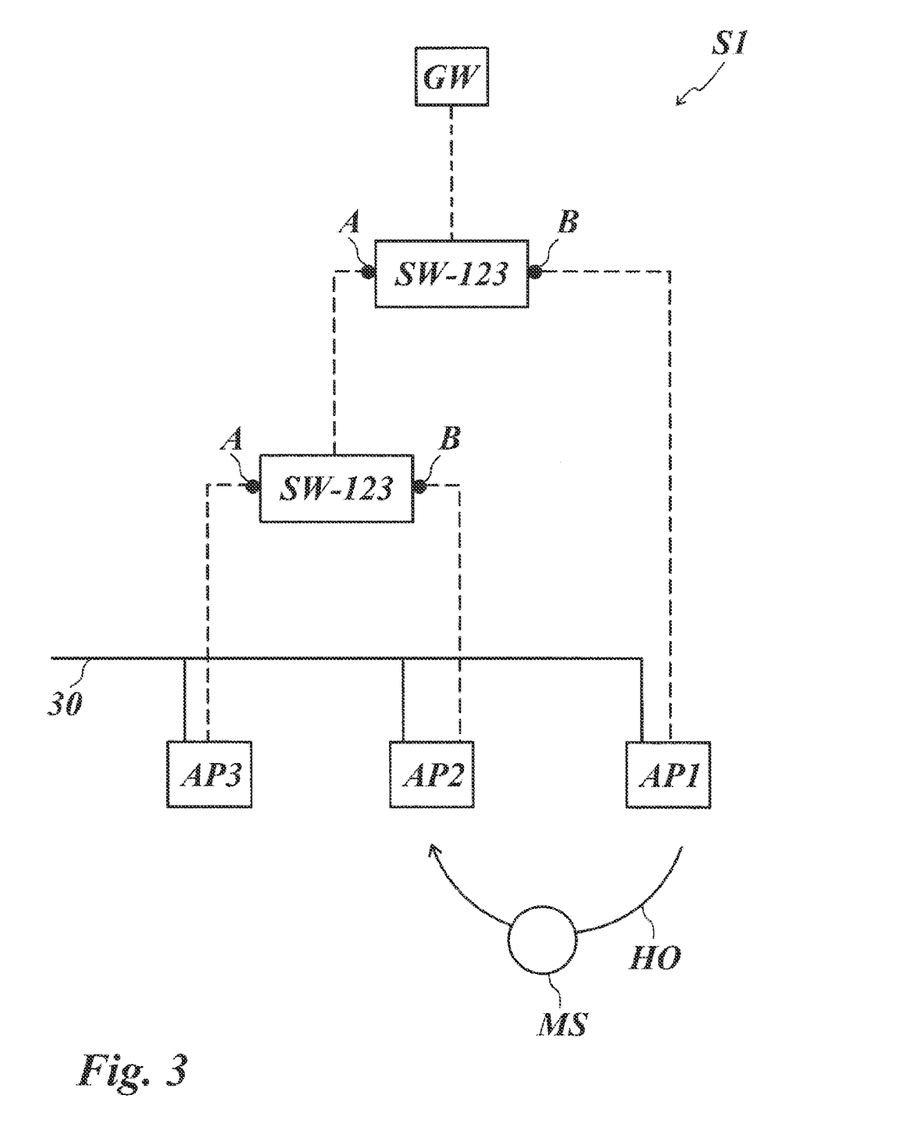
FIG. 3 is a schematic diagram of an intra-segment handover in a segment of the Ethernet-based telecommunication network shown in FIG. 1.

FIG. 3 shows a schematic view of the segment S1 wherein the mobile station MS performs a handover HO from the source access point AP1 to the target access point AP2 while maintaining an ongoing communication session. The target access point AP2 and a further access point AP3 are directly connected to the H2 switch SW-23 having two ports A and B. The source access point AP1 and the H2 switch SW-23 are directly connected to the switch SW-123 having ports A and B. The switch SW-123 is connected to the segment gateway switch GW which represents the root node of the tree-structured segment S1. The source access point AP1, the target access point AP2, and the further access point AP3 are leaf nodes of the tree-structured segment S1.

All access points AP1-AP3 are interconnected by a control network 30 used for handover handshaking and buffer synchronisation. During the handover, the mobile station MS, or the access point AP1, AP2 if the mobile station MS is already disconnected, sends control packets to inform the other switches SW-12, SW-123 about the new route to the destination.

The switch SW-123 serves as the anchor switch for the handover HO of the mobile station MS.

The anchor switch is a switch SW-123 of the segment S1 whose position in the tree structure of the segment S1 is hierarchically above the source and target access points AP1, AP2 and below the segment gateway switch GW and which is common to an ongoing session before and after the handover HO. During the handover HO, i.e. the movement of the mobile station MS from the source access point AP1 to the target access point AP2, the switch SW-123 serving as the anchor switch bi-casts payload traffic (session packets carrying voice data, media data, etc.) associated with the ongoing session to both the source access point AP1 and the target access point AP2 to enable a soft handover HO with minimal traffic loss.

The switch SW-123 serving as the anchor switch with regard to the intra-segment handover HO is composed of one or several inter-linked computers, i.e., a hardware platform, a software platform basing on the hardware platform and several application programs executed by the system platform formed by the software and hardware platform. The functionality of the switch SW-123 serving as the anchor switch are provided by the execution of these application programs. The application programs or a selected part of these application programs constitute a computer software product providing a handover service as described in the following, when executed on the system platform. Further, such computer software product is constituted by a storage medium storing these application programs or said selected part of application programs.

From a functional point of view, the switch SW-123 comprises a control unit adapted to receive an update entry request addressed to the segment gateway switch GW which is sent, after establishing contact between the mobile station MS and the target access point AP2, by the mobile station MS or the target access point AP2, whereby the update entry request contains an address of the mobile station MS, check whether a forwarding database of the switch SW-123 contains a first entry comprising the address of the mobile station MS received by means of the update entry request, if the forwarding database of the switch SW-123 contains the said first entry, squelch (=discard) said update entry request and assume the function of the anchor switch regarding the handover HO, based on said update entry request, bi-cast the session traffic addressed to the mobile station MS both via the source access point AP1 and the target access point AP2, receive and squelch a cancel entry request addressed to the segment gateway switch GW which is sent by the mobile station MS or the source access point AP1 when disconnecting the mobile station MS from the source access point AP1, and discontinue, based on said cancel entry request, the routing of the session traffic addressed to the mobile station MS via the source access point AP1.

It is possible that operations like the identification of the anchor switch, sending and receiving updating and cancelling entries etc. are implemented as close to the hardware as possible ("fast path"). This may be advantageous because time is a critical factor in the handover process. Network processors (NPs) can fulfil this requirement: The operations needed for the method according to the present invention can be realised in these devices at wire speed. Preferably, the functions needed for the method according to the present invention are implemented on existing hardware only by software upgrades.

Figure 4:
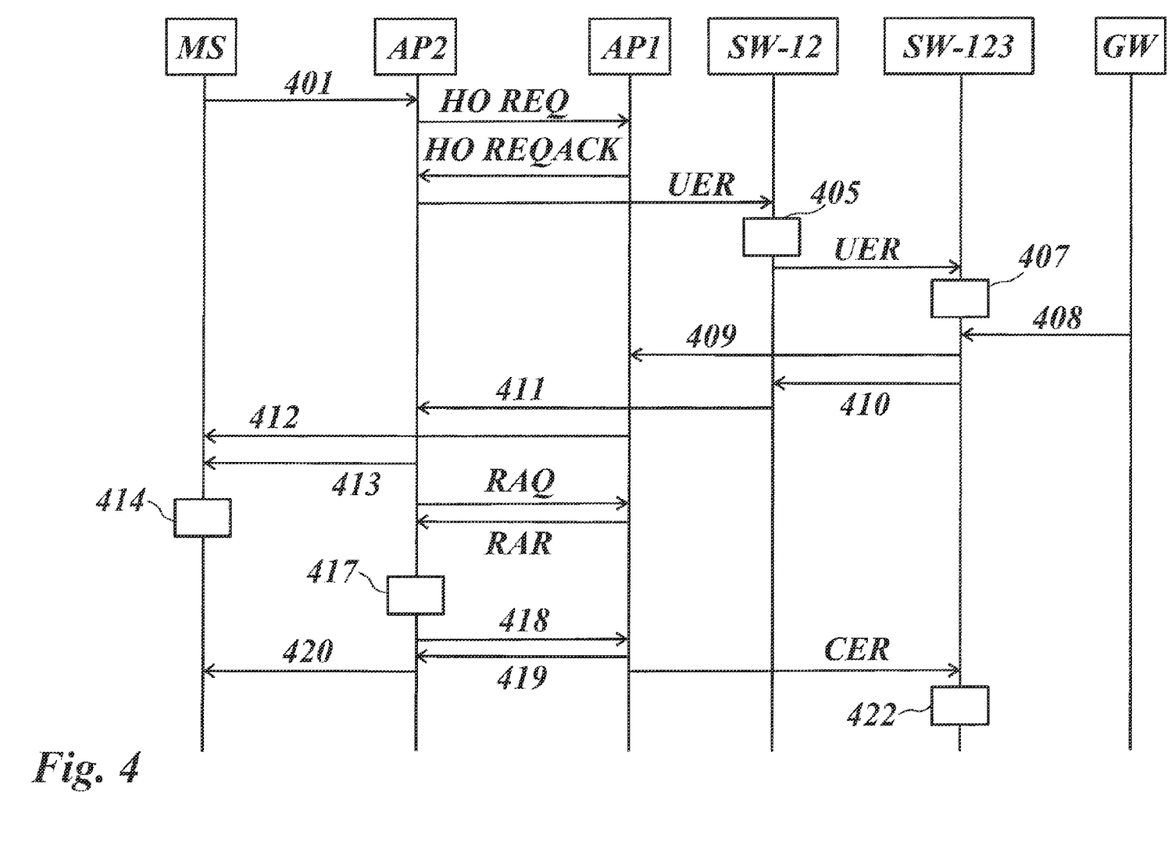
FIG. 4 is a message flow sequence associated with the intra-segment handover according to FIG. 4.

FIG. 4 is a message sequence flow diagram illustrating the exchange of messages associated with the handover of the mobile station MS from the source access point AP1 to the target access point AP2. The diagram further shows the Layer 2 switches SW-12, SW-123 and the segment gateway switch GW as shown in FIG. 3. As soon as there is a connection 401 of the mobile station MS with the target access point AP2, the target access point AP2 sends a handover request HO REQ to the source access point AP1. As an acknowledgement of the received handover request HO REQ, the source access point AP1 sends a handover approval HO REQ ACK to the target access point AP2. After receipt of the sent handover approval HO REQ ACK, the target access point AP2 sends the update entry request UER addressed to the segment gateway switch GW towards the segment gateway switch GW.

The update entry request UER is received by the switch SW-12 lying on the routing path between the target access point AP2 and the segment gateway switch GW and checks whether a forwarding database of the switch SW-12 contains a first entry comprising the address of the mobile station received by means of the update entry request UER. The switch SW-12 does not find an entry comprising the address of the mobile station MS in its forwarding database, so it forwards the update entry request UER up to the next switch towards the segment gateway switch GW. The next higher switch SW-123 in the hierarchy of the segment S1 receives the update entry request UER. Having received the update entry request, the switch SW-12 learns the MAC address of the mobile station MS and checks 407 whether the forwarding database of the switch SW-123 contains a first entry comprising the address of the mobile station MS received by means of the update entry request UER.

Because the switch SW-123 is already on the routing path of the traffic of the ongoing session between the gateway GW and the mobile station MS via the source access point AP1, the address of the mobile station MS is contained in a first entry of the forwarding database of the switch SW-123. Therefore the switch SW-123 assumes the function of an anchor switch regarding the handover. When incoming traffic of the ongoing session 408 addressed to the mobile station MS arrives from the segment gateway switch GW at the switch SW-123 acting as an anchor switch, the switch SW-123 serving as the anchor switch bi-casts 409-413 the session traffic addressed to the mobile station MS both via the source access point AP1 and the target access point AP2. Preferably, the bi-casted packets arrive 412, 413 at the mobile station MS at the same time 414. This may be advantageous for a switch without latency or providing an opportunity to select a favourable signal.

When the bi-casting 409-413 is established, the handover from the source access point AP1 to the target access point AP2 can be executed. Before initiating the handover, the target access point AP2 sends a resource availability query RAQ to the source access point AP1 so as to request a confirmation of an availability of resources for the handover. As a response to the received resource availability query RAQ, the source access point AP1 sends a resource availability response RAR as the requested confirmation of the availability of resources for the handover to the target access point AP2. At this point, the target access point AP2 has sufficient bandwidth available 417. Next the target access point AP2 sends a handover switch 418 which is acknowledged by the source access point AP1 by means of a handover switch acknowledgement 419 sent back to the target access point AP2.

At this point, the target access point AP2 performs an interface switch 420 to the mobile station MS, and the source access point AP1 sends a cancel entry request CER to the switch SW-123 serving as the anchor switch.

Contrary to conventional handover method, the cancel entry request CER is not sent from the anchor switch but instead from the mobile station MS and the corresponding source access point AP1, respectively. The reason for that is that the mobile station MS is the first to know (i.e. the first handover-involved network unit to detect) when the handover has been successfully completed or cancelled. Therefore, the mobile station MS can send the Cancel Entry Request CER addressed to the MAC address of the segment gateway switch GW. The Cancel Entry Request CER is routed the path directed to the segment gateway switch GW until it reaches the switch SW-123 serving as the anchor switch. At the switch SW-123 serving as the anchor switch, the Cancel Entry Request CER is squelched.

Another advantage of sending the Cancel Entry Request CER from the direction of the mobile station MS is that the Cancel Entry Request CER arrives on the same port as the Update Entry Request UER sent before. This makes processing easier as it allows for checking for the right entry.

When the switch SW-123 serving as the anchor switch receives the cancel entry request CER, the switch SW-123 serving as the anchor switch deletes the first entry from its forwarding database, i.e. discontinues the bi-casting and squelches (=discards) the cancel entry request CER.

Figure 5:
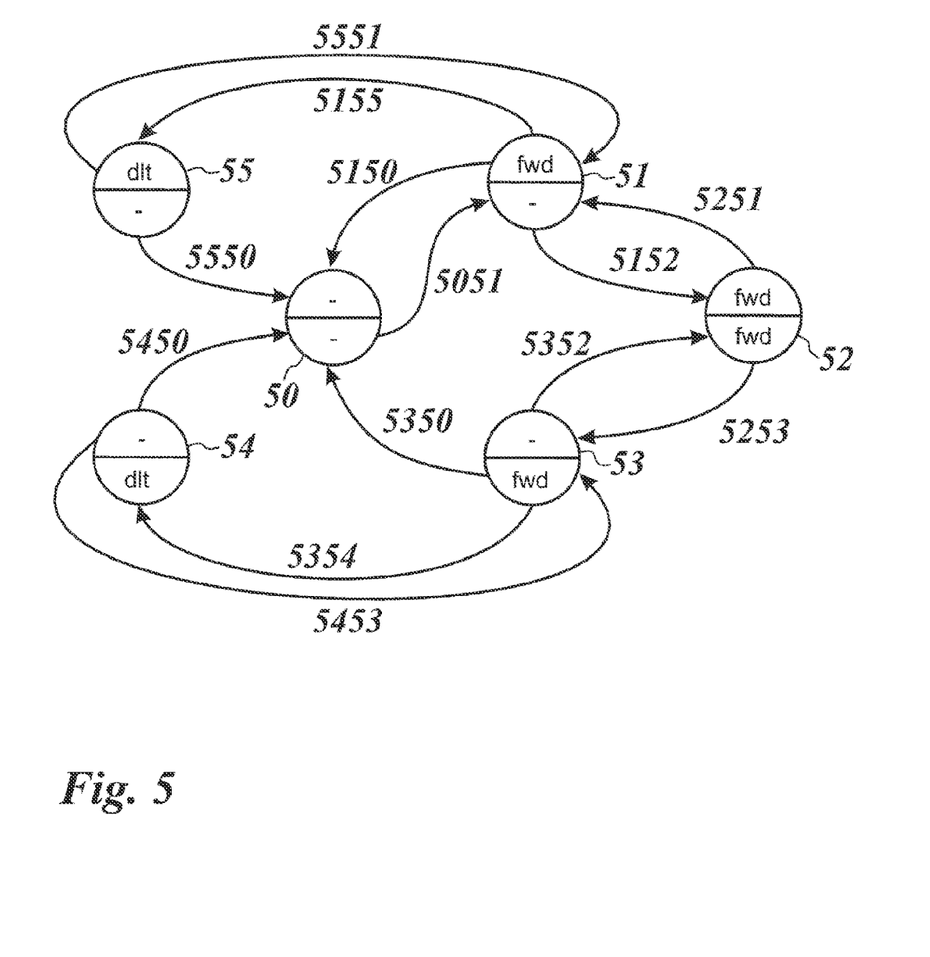
FIG. 5 is a state diagram of entries in a forwarding database.

FIG. 5 shows a state diagram describing the possible entry states in a forwarding database of a switch (MAC address table). In the Mobile Ethernet architecture, each entry in a forwarding database of a switch can hold two destinations. In FIG. 5, an entry is depicted by a circle divided by a horizontal line, thereby forming two semicircles. The destinations are given within the two semicircles. The architecture shown in FIG. 5 is fully transparent to standard MAC address learning which relies on learning source addresses from data packets.

The operation starts with an empty entry "-/-" 50 in the forwarding database. This initial state "-/-" 50 does not hold any destination. By learning a MAC address, for example by means of an update entry request 5051, the state "fwd/-" 51 with one forwarding destination "fwd" can be reached (fwd=forwarding). By applying an ageing timer 5150, the initial state "-/-" 50 can be reached again. From the state "fwd/-" 51, an update entry request 5152 leads to the state "fwd/fwd" 52 which represents a bi-cast state with two destinations "fwd/fwd". By a cancel entry request/update entry 5251, the state "fwd/-" 51 can be reached again. From the state "fwd/-" 51, a cancel entry request 5155 leads to the state "dlt/-" 55 where the forwarding destination "fwd" has been replaced by an intermediate state "dlt".

If forwarding entries "fwd" in switches are deleted by Cancel Entry Requests before the corresponding bi-cast entry in the Anchor Switch has been removed, there will be flooding in the network. This would degrade network performance. Therefore, the intermediate state "dlt" is introduced for entries in the forwarding databases, which are still able to forward packets but may be aged out or overwritten at any time. Existing switches can be changed to implement this intermediate state "dlt" by software upgrades if the functionality is implemented on network processors (NPs).

From the state "dlt/-" 55, a learning/update entry request 5551 leads again to the state "fwd/-" 51. From the state "dlt" 55, a (fast) ageing timer 5550 leads to the initial state "-/-" 50. From the bi-cast state "fwd/fwd" 52, a cancel entry request/ update entry 5253 leads to the state "-/fwd" 53 with a forwarding destination. From the state "-/fwd" 53, an ageing timer 5350 leads to the initial state "-/-" 50. From the state "-/fwd" 53, an update entry request 5352 leads back to the bi-cast state "fwd/fwd" 52. From the state "-/fwd" 53, a cancel entry request 5354 leads to the intermediate state "-/dlt" 54, whereas a learning/update entry request 5453 leads from the intermediate state "-/dlt" 54 back to the state "-/fwd" 53. From the intermediate state "-/dlt" 54, a (fast) ageing timer 5450 leads back to the initial state "-/-" 50.

The invention claimed is:

1. A method of performing an intra-segment handover of a mobile station from a source access point of a tree-structured segment of an Ethernet-compliant telecommunication network to a target access point of said segment, whereby a segment gateway switch is the root node of the tree-structured segment, and whereby the source access point and the target access point are leaf nodes of the tree-structured segment, the method comprising the steps of:

relaying, by the source access point, session traffic associated with an ongoing session to and from the mobile station;

after establishing contact between the mobile station and the target access point, sending, by the mobile station or the target access point, an update entry request addressed to the segment gateway switch whereby the update entry request contains an address of the mobile station;

receiving, by a switch positioned in the tree structure of the segment hierarchically above the source and target access points and below the segment gateway switch, the update entry request;

checking, by the said switch, whether a forwarding database of the switch contains a first entry comprising the address of the mobile station received by means of the update entry request;

if the forwarding database of the switch contains the said first entry, squelching said update entry request by the switch and assuming by the switch the function of an anchor switch regarding the handover, whereby the anchor switch is a switch of the segment which is positioned in the tree structure of the segment hierarchically above the source and target access points and below the segment gateway switch and which is common to the ongoing session before and after the handover;

based on said update entry request, bi-casting, by the switch serving as the anchor switch, the session traffic addressed to the mobile station both via the source access point and the target access point;

when disconnecting the mobile station from the source access point, sending, by the mobile station or the source access point, a cancel entry request addressed to the segment gateway switch; and receiving and squelching said cancel entry request by the switch serving as the anchor switch and discontinuing, based on said cancel entry request, the routing of the session traffic addressed to the mobile station via the source access point.

2. The method of claim 1,
wherein
the method further comprises the steps of:

triggered by the received update entry request, generating a mapping of the received address of the mobile station to a route via the target access point and adding said mapping as a second entry to the forwarding database of the switch serving as the anchor switch, whereby said forwarding database already contains a mapping of the address of the mobile station to a route via the source access point as the said first entry and whereby an entry in the forwarding database indicates via which access point the session traffic addressed to the mobile station is to be routed to the mobile station; and triggered by the received cancel entry request, deleting the said first entry from the said forwarding database of the switch serving as the anchor switch.

3. The method of claim 2,
wherein
the method further comprises the steps of:

when sending the update entry request, identifying the switch appropriate to serve as the anchor switch based on the presence of the first entry in the forwarding database of the switch; and when sending the cancel entry request, identifying the switch serving as the anchor switch based on the presence of the first entry and the second entry in the forwarding database of the anchor switch.

4. The method of claim 1,
wherein
the method further comprises the steps of:

learning, by one or more first switches of the segment lying on a routing path of the update entry request via the target access point towards the segment gateway switch, the address of the mobile station from said update entry request and adding a forwarding entry associated with the learned address to a respective forwarding database of the first switches; and deleting, by one or more second switches of the segment lying on a routing path of the cancel entry request via the source access point towards the segment gateway switch, a forwarding entry associated with the address of the mobile station from a respective forwarding database of the second switches based on said cancel entry request.

5. The method of claim 4,
wherein
the step of learning the address of the mobile station from said update entry request by the said one or more first switches is according to the MAC address learning method as defined in IEEE 802.1.

6. The method of claim 4,
wherein
the method further comprises the step of:

replacing the forwarding entry associated with the address of the mobile station which is deleted from a respective forwarding database of the second switches based on said cancel entry request with an intermediate state entry which temporarily enables forwarding of session traffic until a forwarding entry associated with the bi-casting by the switch serving as the anchor switch has been removed from the forwarding database of the switch serving as the anchor switch.

7. The method of claim 1,
wherein
the method further comprises the steps of:

after said establishment of contact between the mobile station and the target access point, sending, by the target access point, a handover request to the source access point;

as a response to the received handover request, sending, by the source access point, a handover approval to the target access point; and sending, by the mobile station or the target access point, the said update entry request addressed to the segment gateway switch after receipt of the said handover approval.

8. The method of claim 1,
wherein
the method further comprises the step of:
receiving the update entry request and the cancel entry request on the same port of the switch serving as the anchor switch.

9. The method of claim 1,
wherein
the method further comprises the step of:
controlling by means of a sequence numbering or a buffering procedure the arrival times of two corresponding packets of the bi-casted session traffic at the mobile station whereby one packet of the two corresponding packets arrives at the mobile station via the target access point and the other packet of the two corresponding packets arrives at the mobile station via the source access point.

10. The method of claim 1,
wherein
the update entry request and the cancel entry request are Ethernet packets without payload which carry the MAC address of the mobile station as a source address and the MAC address of the segment gateway switch as a destination address.

11. The method of claim 1,
wherein
the method further comprises the step of:
before disconnecting the mobile station from the source access point, sending, by the target access point, a resource availability query to the source access point so as to request a confirmation of an availability of resources for the handover;
as a response to the received resource availability query, sending, by the source access point, a resource availability response as the requested confirmation of the availability of resources for the handover to the target access point; and
disconnecting the mobile station from the source access point only after receipt of the resource availability response.

12. A switch of a tree-structured segment of an Ethernet-compliant telecommunication network, the switch serving as an anchor switch regarding an intra-segment handover of a mobile station from a source access point of the segment to a target access point of the segment, whereby a segment gateway switch is the root node of the tree-structured segment and the source access point and the target access point are leaf nodes of the tree-structured segment, whereby the anchor switch is a switch of the segment whose position in the tree structure of the segment is hierarchically above the source and target access points and below the segment gateway switch and which is common to an ongoing session before and after the handover, and whereby session traffic associated with the ongoing session is relayed, before the handover, by the source access point to and from the mobile station, the switch comprising a control unit adapted to receive an update entry request addressed to the segment gateway switch which is sent, after establishing contact between the mobile station and the target access point, by the mobile station or the target access point, whereby the update entry request contains an address of the mobile station, check whether a forwarding database of the switch contains a first entry comprising the address of the mobile station received by means of the update entry request, squelch, if the forwarding database of the switch contains the said first entry, said update entry request and assume the function of the anchor switch regarding the handover, bi-cast, based on said update entry request, the session traffic addressed to the mobile station both via the source access point and the target access point, receive and squelch a cancel entry request addressed to the segment gateway switch which is sent by the mobile station or the source access point when disconnecting the mobile station from the source access point, and discontinue, based on said cancel entry request, the routing of the session traffic addressed to the mobile station via the source access point.

* * * * *